United States Patent [19]

Makabe et al.

[11] Patent Number: 4,590,880
[45] Date of Patent: May 27, 1986

[54] ELECTRONIC SEWING MACHINE HAVING MEANS FOR INDICATING A SERIES OF PATTERN NUMBERS IN NORMAL AND REVERSE ORDER

[75] Inventors: Hachiro Makabe, Kanagawa; Haruhiko Tanaka, Tokyo; Takashi Kongoh, Koganei, all of Japan

[73] Assignee: Janome Sewing Machine Co., Ltd., Tokyo, Japan

[21] Appl. No.: 616,433

[22] Filed: May 31, 1984

[30] Foreign Application Priority Data

Jun. 10, 1983 [JP] Japan .............................. 58-87819[U]

[51] Int. Cl.$^4$ .......................... D05B 3/02; D05B 19/00
[52] U.S. Cl. ..................................... 112/445; 112/454
[58] Field of Search ........... 112/158 E, 158 F, 121.11, 112/121.12, 454, 453, 445

[56] References Cited

U.S. PATENT DOCUMENTS

| | | | |
|---|---|---|---|
| 4,122,786 | 10/1978 | Tanimoto et al. | 112/158 E |
| 4,413,574 | 11/1983 | Hirota et al. | 112/158 E X |
| 4,499,836 | 2/1985 | Meier et al. | 112/158 E |
| 4,502,402 | 3/1985 | Kato | 112/158 F X |

Primary Examiner—Peter Nerbun
Attorney, Agent, or Firm—Michael J. Striker

[57] ABSTRACT

An electronic sewing machine has a memory storing stitch control data for a number of different patterns which may be selected by designation of pattern numbers each specific to the patterns, a second memory for temporarily storing the pattern numbers as they are selected, and a display for electrically indicating the selected pattern numbers in the order as they have been stored in the second memory, maintaining a precededly displayed pattern number until the subsequent one is selected, wherein the ten-keys may be selectively operated to select any of the patterns stored in the first memory, the ten-keys indicating at least two specific ten-keys to be operated to provide at least two different two-figure numbers for changing the function of at least two function keys originally having specific functions respectively into the function for confirming at the display the selected pattern numbers in series in the order and the reverse order as they have been selected respectively, and a signal discriminating circuit, a function changing circuit and a pattern number read-out circuit are provided between the ten-keys and the second memory so as to be operated in accordance with the selective operation of the two specific ten-keys to thereby designate the selected and memorized in the second memory to appear in the two different orders in dependence upon the operation of the function keys.

1 Claim, 4 Drawing Figures

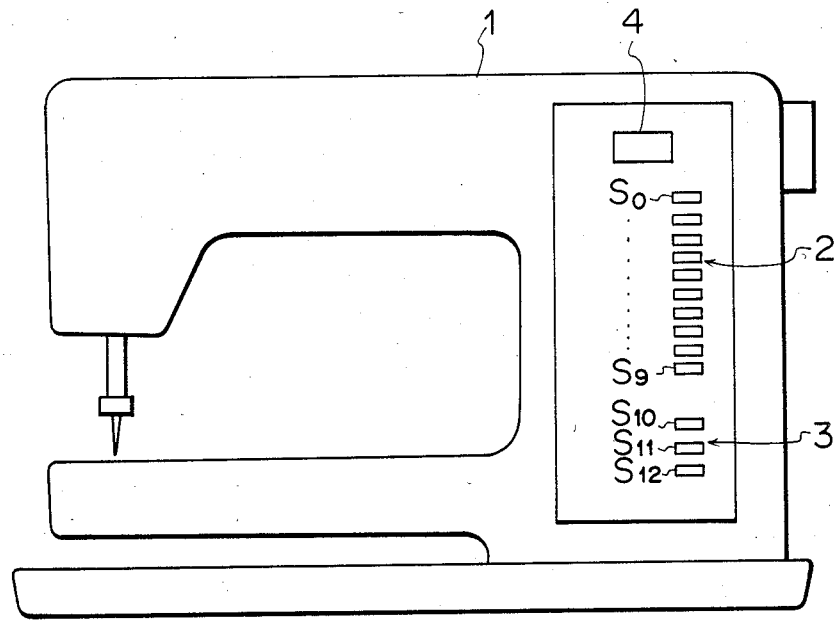
FIG_1
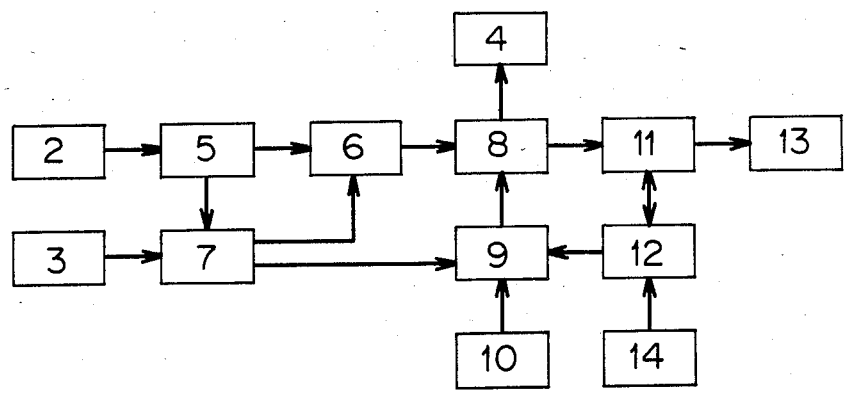
FIG_2

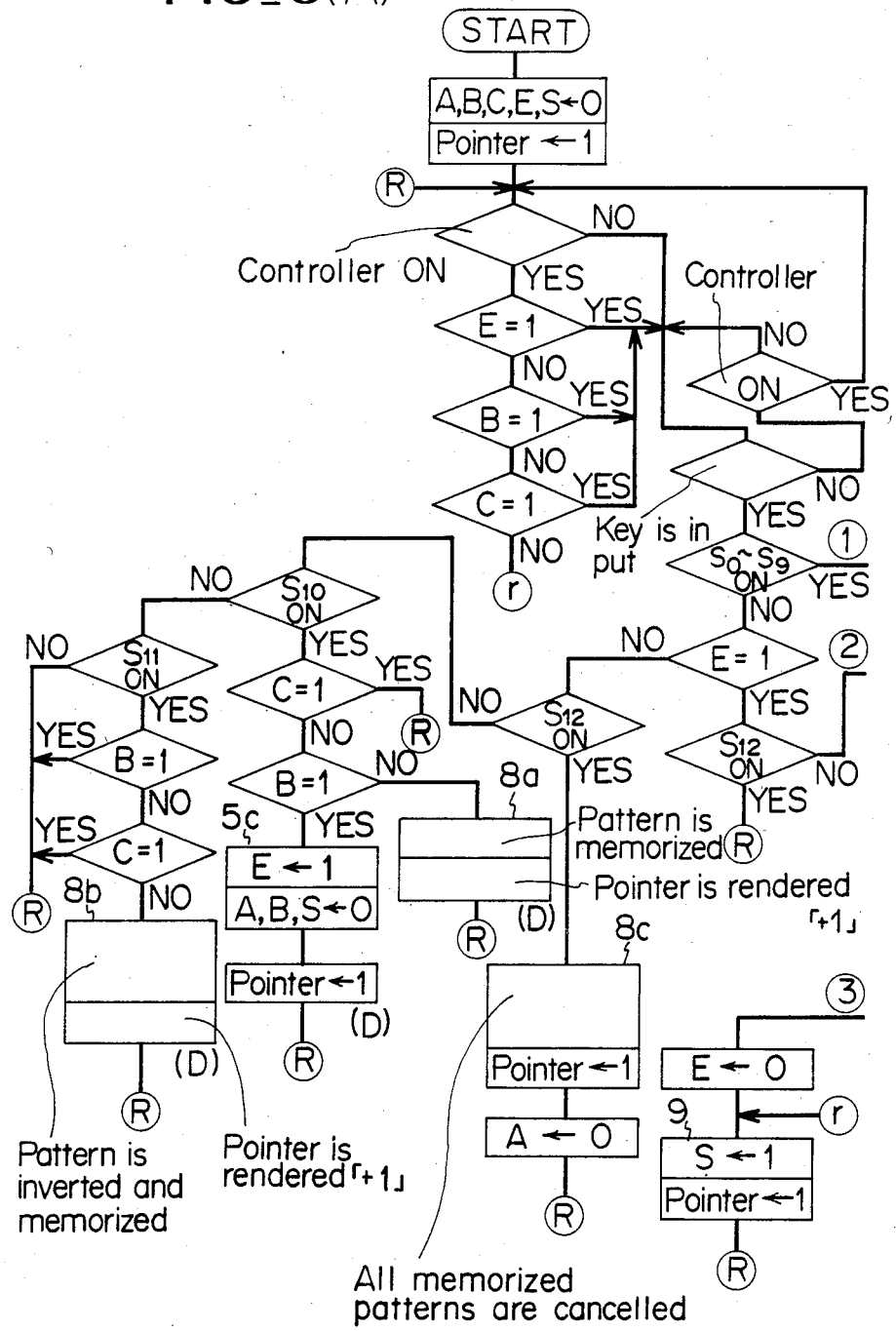

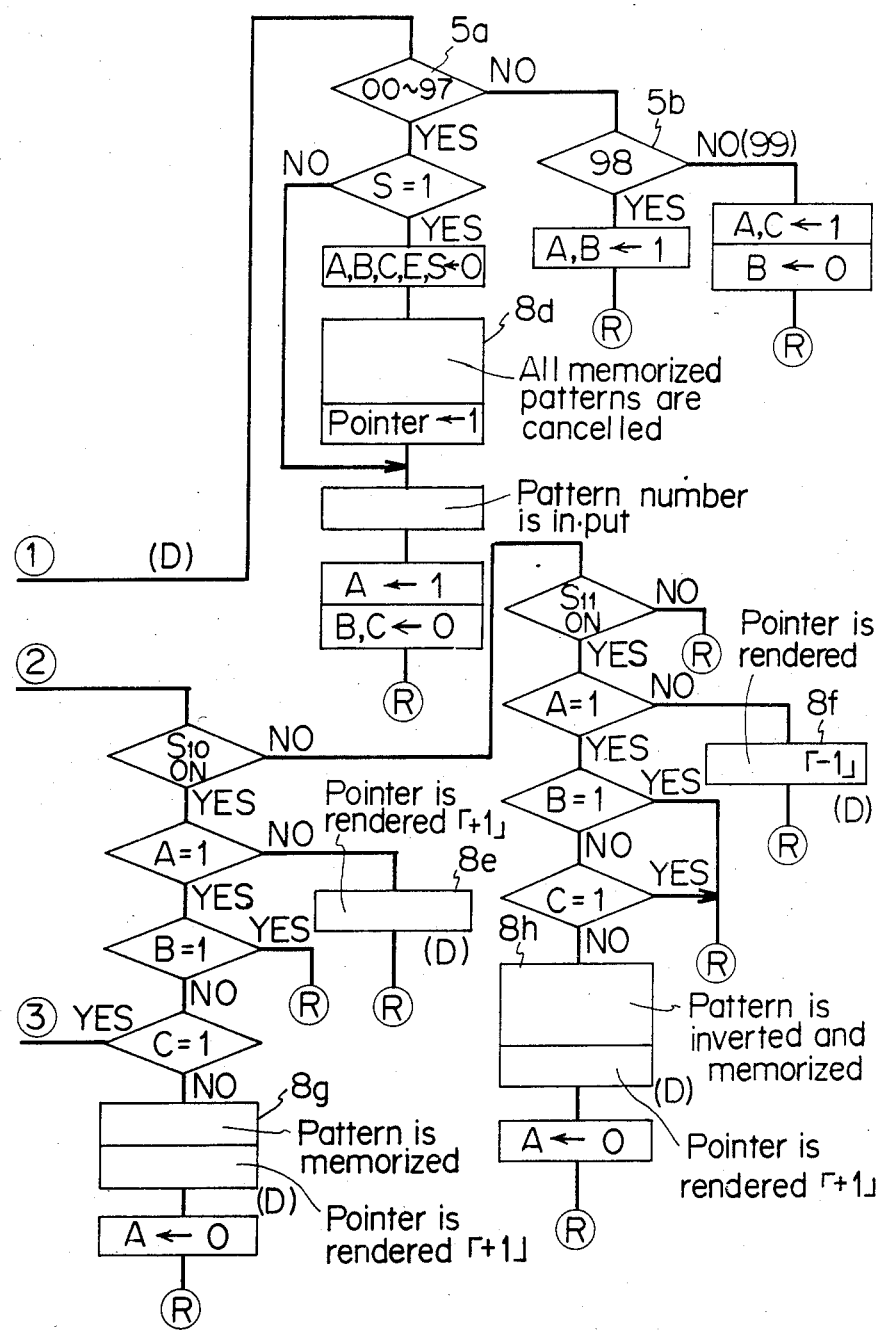
FIG_3(B)

ELECTRONIC SEWING MACHINE HAVING MEANS FOR INDICATING A SERIES OF PATTERN NUMBERS IN NORMAL AND REVERSE ORDER

FIELD OF THE INVENTION

This invention relates to selection and indication of patterns to be stitched of an electronic control sewing machine which forms stitched patterns in accordance with signals of an electronic memory.

BACKGROUND OF THE INVENTION

Electronic control sewing machines select a plurality of patterns and store them, and automatically form them in succession. The stored patterns and their storing order could be confirmed only after they have been stitched. Therefore, especially if a lot of patterns were memorized, the confirmation would be difficult.

SUMMARY OF THE INVENTION

In the present invention, a pattern number is designated by a ten key to select a pattern, and a function key is operated per each of selected patterns to store the selected pattern in a pattern number memory. By repeating these operations a lot of patterns are memorized. On the other hand, specific numbers which do not correspond to the pattern numbers are prepared, and if the specific number is designated by the ten key after said memorization, a function key serves reading-out or other functions instead of the memorizing function. In the reading-out function, the memorizing position is changed in designation per each of its operations, and a corresponding pattern number is read out, and is shown in an indicator, so that the memorized patterns could be confirmed.

BRIEF DESCRIPTION OF THE DRAWINGS

FIG. 1 is an outer appearance of a sewing machine relating to the present invention, FIG. 2 is a control block diagram showing an embodiment of the invention; and FIGS. 3(A) and 3(B) are a control flow chart.

DETAILED DESCRIPTION OF THE INVENTION

The present invention will be explained in reference to an embodiment shown in the drawings. The sewing machine is provided with ten-keys 2 shown with ($S_0$) to ($S_9$) at its front part 1, in which a numeral of two figures is designated by two operations, so that a pattern corresponding to any of the numbers 00 to 97 are made ready for selection, and on the other hand, later mentioned changing of the function is designated by specific numbers 98 and 99 which are not the pattern numbers.

Function keys 3 comprise a memory key ($S_{10}$), an invertion memory key ($S_{11}$) and a cancel key ($S_{12}$). The memory key ($S_{10}$) is operated for designating memorization of the selected pattern and confirming said memorized pattern. The invention memory key ($S_{11}$) is operated for inverting the pattern to the left and the right with respect to a center of a needle amplitude and designating the memorization thereof, and also for said confirmation. The cancel key ($S_{12}$) is operated for cancelling the memorization of the patterns.

An indicator 4 shows by lighting the numbers of the selected patterns and the pattern numbers for confirmation with the numerals of the two figures.

FIG. 2 is a control block diagram. A discriminating circuit 5 discriminates the numbers of two figures designated by the ten key 2. If any one of 00 to 97 is shown, the circuit 5 gives its number signal to a pattern number memory circuit 6, and it gives to a function changing circuit 7 a signal discriminating that said number of the two figures belongs to a correct pattern number. If either 98 or 99 is shown, the circuit 5 designates a later mentioned confirmation to the function changing circuit 7, or gives thereto a discriminating signal that said number is a specific signal for designating finish of the confirmation.

The function changing circuit 7 is for changing a plurality of functions of the function key 3 in response to the signal from the discriminating circuit 5. When any one of 00 to 97 is designated by the ten-key 2, the circuit 7 changes the operations of the memory key ($S_{10}$), the inversion memory key ($S_{11}$) or the cancel key ($S_{12}$) to serve as memorization or cancelling so that the pattern number memory circuit 6 is worked.

A pattern number memory device 8 is controlled by the pattern number memory circuit 6, and stores signals of a plurality of the selected pattern numbers at storing positions. The storing position is changed each time the memory key ($S_{10}$) or the inversion memory key ($S_{11}$) is operated.

For the function changing circuit 7, when 98 or 99 is designated by the ten-key 2, the memory key ($S_{10}$) and the invertion memory key ($S_{11}$) function respectively for confirmations thereof, otherwise they are changed to finish and designate the confirmations to operate a pattern number reading-out circuit 9. At this changing time, the cancel key ($S_{12}$) is not worked.

The pattern number memory device 8 is controlled by a pattern number reading-out circuit 9. Every time the memory key ($S_{10}$) is operated, following the memorizing order, the memorizing position is changed in designation and the pattern number is read out. When the inversion memory key ($S_{11}$) is operated, the pattern number is read out by reversely following said memorizing order.

Every time the memorizing position in the pattern number memory device 8 is changed in designation by the pattern number memory circuit 6 or the pattern number reading-out circuit 9, the indicator 4 shows by lighting the pattern number of said memorizing position. In the operation of the ten-key 2, the pattern number is in preference, and this pattern number is continuously indicated until a next operation of the ten-key, When the machine controller 10 is operated at the initial period of stitching, the pattern number reading-out circuit 10 outputs the pattern number signal of the pattern initially stored to the pattern number memory device 8.

A stitch control signal memory 11 electronically stores stitch control signals of the stitched patterns. When the pattern is designated by the pattern number memory 8, the stitch control signals of said patterns are read out by the stitch signal reading-out circuit 12 and are output to a pattern forming device 13.

Timing of stitch advancing is performed in response to rotation synchronizing signal of an upper shaft of the sewing machine issued from a synchronizng signal generator 14. Each time the stitch signal reading-out circuit 12 receives a final signal from the stitch control signal memory 11, the pattern number reading-out circuit 9 changes in designation of the memorizing position of the pattern number memory 8, following the memorizing order.

A further explanation will be made to the embodied actuation of the above mentioned structure with reference to FIG. 3.

Flags A, B, C, E, S are reset at 0 as initial setting, and address pointers concerning the designations of the memorizing positions of the pattern number memory circuit 6 and the pattern number reading-out circuit 9 are reset at first values 1. If the machine controller 4 is not operated an input of the ten-key 2 or the function key 3 is awaited. When the number of two figures is designated by the ten-key 2, this number is indicated at the indicator 4 (FIG. 3 shows each of indicating points with the signal "D"). If this number belongs to any one of 00 to 97 of the pattern numbers, a process 5a discriminates it, and the pattern number is input, and the flag A is set 1 to indicate presence of the key input. If the number is not 98, the flag B is reset at 0, and if it is not 99, the flag C is reset at 0. The program goes to a process which has passed a return signal (R) in the flow chart. When the function key 3 is operated, the program enters actuation of the pattern number memorization. For example, when the memory key ($S_{10}$) is operated and then since the flag E=0, C=0, B=0 are provided respectively, the designated pattern number is memorized, by the process 8a, at the first memorizing position of the pattern number memory 8, and said pattern is indicated, and the memorizing position (pointer) is rendered 30 1 for a next memorization.

When a next pattern number is designated by the ten-key 2 and the memory key ($S_{10}$) is operated, this pattern number is memorized in a next memorizing position. By repeating such operations, a lot of patterns are stored. If the inversion memory key ($S_{11}$) is operated instead of the memory key ($S_{10}$) in the above mentioned operation, a designation is made to form the pattern in inversion by a process 8b and this operation is memorized. If the cancel key ($S_{12}$) is operated during the above mentioned operation, the patterns previously memorized in the process 8c are all cancelled. The pointer is reset at 1, and the flag A is reset at 0.

When the controller 10 is operated after said memorizations, a flag S is set at 1, which shows that the program has entered the stitching mode by the process passing a return signal (r), and the pointer designates the first memorized pattern, and from this pattern the stitching is begun. The pattern number is designated by the ten-key 2, the flags A, B, C, E, S are reset at 0 in the process 8d, and the previously memorized patterns are all cancelled, and the pointer is reset at 1, and these pattern numbers are memorized. If 98 is designated by the ten-key 2 after a plurality of the patterns are successively memorized, or after the stitching is formed and the controller 10 made OFF it is discriminated by the process 5b, and the flag A=1 and B=1 are provided. When the memory key ($S_{10}$) is operated, the flag E=1 is provided in the process 5c as starting of the read-out, and the flag A=0 and B=0 are provided, and the pointer designates 1, i.e., the first memorized pattern, and this pattern is indicated. Each time the memory key ($S_{10}$) is operated, the pointer advances in the process 8e, and the pattern numbers are successively indicated, following the memorizing order. If the inversion memory key ($S_{11}$) is operated instead of the memory key ($S_{10}$) after having passed the process 5c, the pointer advances in the process 8f, following reversely the memorizing order, and the pattern number is indicated.

An explanation will be made as to how new patterns are appropriately exchanged for the previously memorized patterns and are stored. If the ten-key 2 is operated for memorizing new patterns in place of the previous patterns while 98 is designated by the ten-key 2 and the pattern is indicated by the process 8e or 8f, then new pattern numbers are input, and the flag A=1, B=0, C=0 are provided, and if the memory key ($S_{10}$) is operated subsequently, said new patterns are memorized by the process 8g and are indicated. When the inversion key ($S_{11}$) is operated instead of the memory key ($S_{10}$), the inverted pattern is memorized simultaneously by the process 8h and is indicated, and when the ten-key 2 is operated to designate 99, the flag A=1, C=1, B=0 are provided. If the memory key ($S_{10}$) is operated subsequently, the flag E=0 is provided as the read-out of them or finish of memorizing function of replacement, and the flag S=1 is provided by the process 9, and a stitching mode is effected. The pointer designates the first memorized patterns, and operates the controller 10 so that the stitching is begun from said pattern.

As mentioned above, according to the invention, the key is in charge of multi-functions so that it is not necessary to prepare new and exclusive keys, and the stored patterns may be confirmed by easy operation.

We claim:

1. An electronic sewing machine, comprising a memory storing stitch control data for a plurality of different patterns which may be selected by designation of pattern numbers each specific to the stored patterns;

a second memory for temporarily storing the pattern numbers as the latter are selected in series;

a display for electrically indicating the selected pattern numbers one after another as the latter are stored in said second memory, maintaining a precededly selected pattern number until the subsequent one is selected;

pattern selecting means including ten-keys selectively operated to provide two-figure numbers for selecting said stored patterns, said ten-keys including at least two ten-keys operated in combination to provide at least two specific two-figure numbers;

function key means including at least two-function keys selectively operated in conjunction with said ten-keys to change the function of said sewing machine, one of said function keys being operated to memorize the selected pattern numbers in said second memory;

discriminating circuit means responsive to the selective operation of said ten-keys for selecting said patterns and said two specific ten-keys for providing said specific two-figure numbers, to thereby produce different signals;

pattern number memorizing control circuit means responsive to the operation of said ten-keys for selecting said patterns to cause said second memory to memorize the selected pattern numbers in the order as the latter are selected;

function changing circuit means responsive to the operation of said ten-keys for selecting the stored patterns to produce a signal for maintaining the function of said two-function keys, said function changing circuit means being responsive to the operation of said two-specific ten-keys on one or the other way to produce a different signal for changing the function of said two-function keys; and pattern number read-out circuit means responsive to the operation of one of said two function keys to designate the pattern numbers memorized in said second memory to appear in said display in the order as the latter have been memorized while said function changing circuit means receives a signal from said discriminating circuit means when said two specific ten-keys have been operated in one way, said pattern number read-out circuit means being responsive to the operation of the other of said two function keys to designate said memorized pattern number to appear in said display in the reverse order as the latter have been memorized while said function changing circuit means receives a signal from said discriminating circuit means when said two specific ten-keys have been operated in the other way.

* * * * *